(12) United States Patent
Spry (10) Patent No.: US 7,507,056 B2
(45) Date of Patent: Mar. 24, 2009

(54) APPARATUS FOR CONTROLLING MOVEMENT OF FLOWABLE PARTICULATE MATERIAL

(75) Inventor: William J. Spry, Youngstown, NY (US)

(73) Assignee: Elsie Spry, Wexford, PA (US)

(*) Notice: Subject to any disclaimer, the term of this patent is extended or adjusted under 35 U.S.C. 154(b) by 8 days.

(21) Appl. No.: 11/656,744

(22) Filed: Jan. 23, 2007

(65) Prior Publication Data
US 2007/0147959 A1 Jun. 28, 2007

Related U.S. Application Data

(62) Division of application No. 11/134,945, filed on May 23, 2005, now Pat. No. 7,341,399.

(51) Int. Cl.
*E02D 29/02* (2006.01)
(52) U.S. Cl. ...................................... 405/284
(58) Field of Classification Search ......... 405/284–286, 405/262
See application file for complete search history.

(56) References Cited

U.S. PATENT DOCUMENTS

| | | | | |
|---|---|---|---|---|
| 672,044 | A * | 4/1901 | Staples | 52/307 |
| 701,588 | A * | 6/1902 | Liebau | 256/19 |
| 4,367,978 | A | 1/1983 | Schaaf et al. | |
| 4,498,805 | A | 2/1985 | Weir | |
| 4,708,521 | A | 11/1987 | Kocourek | |
| 4,711,598 | A | 12/1987 | Schaaf et al. | |
| 4,958,806 | A | 9/1990 | Sato et al. | |
| 4,978,247 | A | 12/1990 | Lenson | |
| 5,120,156 | A | 6/1992 | Rauch | |
| 5,791,827 | A * | 8/1998 | Arvai et al. | 405/286 |
| 6,739,827 | B1 | 5/2004 | Spry | |
| 6,896,445 | B1 | 5/2005 | Engler | |
| 7,165,912 | B2 | 1/2007 | Herzog | |

OTHER PUBLICATIONS

Rankine, J.B., "On the Stability of Loose Earth," Philosophical Transactions of the Royal Society of London, vol. 147, Part 1, pp. 9-27, 1857.

* cited by examiner

*Primary Examiner*—Frederick L Lagman
(74) *Attorney, Agent, or Firm*—Eckert Seamans Cherin & Mellott, LLC; Carol A. Manno, Esq.

(57) ABSTRACT

The present invention is directed toward various valving arrangements to control the flow of granular material. In one embodiment, a valve is provided which facilitates flow of the material in one direction, but resists flow in another direction. In another embodiment, a retaining wall is provided with a plurality of generally horizontal passageways, which, under normal circumstances, resist passage of the flowable granular material positioned therebehind and, under modified circumstances, can serve as relief valves to avoid pressure on the wall which might cause the wall to move in an undesirable manner. In a third embodiment, a plurality of valving units is provided for beach retention of sand through efficient separation of sand from incoming waves.

8 Claims, 10 Drawing Sheets

APPARATUS FOR CONTROLLING MOVEMENT OF FLOWABLE PARTICULATE MATERIAL

CROSS-REFERENCE TO RELATED APPLICATION

This application claims the benefit of U.S. patent application Ser. No. 11/134,945 filed May 23, 2005, now U.S. Pat. No. 7,341,399, entitled: "APPARATUS FOR CONTROLLING MOVEMENT OF FLOWABLE PARTICULATE MATERIAL".

BACKGROUND OF THE INVENTION

1. Field of the Invention

The present invention relates to apparatus for controlling movement of flowable granular material in such a manner as to provide efficient valves therefor, along with specific end uses such as retaining walls and for beach renourishment.

2. Description of the Prior Art

It has been known for various purposes to control the movement of flowable granular materials through various mechanical devices, under the influence of gravity or other forces and through various forms of pumping systems.

It has also been known to attempt to resist loss of sand in beaches under the influence of open water waves which tend to apply a force causing particles of sand to become entrained in water and carried away from the beach. For example, various types of physical barriers such as walls, as well as the use of stabilizing plant life and physical objects positioned on beaches, have been employed in an effort to resist undesired erosion.

SUMMARY OF THE INVENTION

The present invention contains several embodiments of flowable granular material control systems. In one embodiment, a valve which can permit free flow and movement of the material in a first direction, but resists such flow in a second direction is provided. In another embodiment, a retaining wall which under normal circumstances serves to retain a formation of flowable granular material is provided. The retaining wall may be provided with a plurality of elongated passageways such that as the angle of repose under normal circumstances will resist undesired flow of the material through the passageways. These passageways may be so provided in number and size as to permit flow therethrough under modified conditions to thereby minimize the likelihood of the wall being toppled by a force imposed by the retained flowable granular material. They also facilitate passage of some of the material through said passageways to thereby resist major landslides.

In a further embodiment of the invention, a beach retention system having a plurality of individual units provided with wave deflection ramps with generally horizontal opening which receive the water containing sand thereover and a plurality of spaced interior barrier plates which receive deposited sand therebetween and have interior horizontal slots for the vertical transfer of sand downwardly and an anchor portion securing the units within sand. The anchors may have valve openings for discharge of drained water after sand is separated therefrom.

It is an object of the present invention to provide improved valves which do not require moving parts and serve to control flow of flowable granular material.

It is yet another object of the present invention to provide applications for such valves which permit flow of the granular material in a first direction while resisting such flow in the opposite direction.

It is another object of the present invention to provide for enhanced stability of structures containing or composed of flowable granular material and for the use in retaining walls having a plurality of passageways which are so positioned and sized as to resist passage of flowable granular material therethrough under normal circumstances and facilitate such passage under unusual circumstances.

It is yet another object of the present invention to provide an effective means for retaining sand on beaches through appropriate control of the flow of incoming water which contains suspended sand.

These and other objects of the invention will be fully understood from the following description of the invention with reference to the drawings appended hereto.

DESCRIPTION OF THE PREFERRED EMBODIMENTS

The present inventor's U.S. Pat. No. 6,739,827 contains disclosures of methods and apparatus for movement of an article employing flowable particulate matter and also contains disclosure of valves suitable for discharging such flowable granular material. The disclosure of this patent is expressly incorporated herein by reference.

As employed herein, the term "earth" is employed in generally conventional sense to mean the fragmental material comprising part of the land portion of the globe. It is sometimes referred to in general usage as "soil" or "dirt".

As employed herein, the term "flowable granular material" means a plurality of solid particles which, under the influence of gravity and other forces, will be subject to relative movement with respect to other such particles and shall expressly include, but not be limited to, sand, earth, soil, bulk grains, rock particles, synthetic particles and combinations thereof. The particles or granules may be considered to have "semi-hydraulic" properties.

As employed herein, the terms "angle of repose" shall refer to the angle that the upper surface of a pile of flowable granular material, such as sand, forms with respect to the horizontal naturally when piled on a flat surface. The angle defines the magnitude of the horizontal force that the sand, for example, exerts when piled against a generally vertical surface. Such angles of repose are frequently about 20 to 46°.

Rankine in Rankine, J. B. (1857), "On the Stability of Loose Earth", Philosophical Transactions of the Royal Society of London, Volume 147, Part 1, Pages 9-27, provided guidance regarding the determination of a stable angle of repose for loose earth under the influence of a uniform force such as gravity. The horizontal force perpendicular to a vertical plane with flowable "earth" is calculated by Rankine to be inversely related to the angle of repose. It increases as the angle of repose decreases. As the angle of repose decreases, the bottom edge of the "earth" moves "outward".

Figure 1:
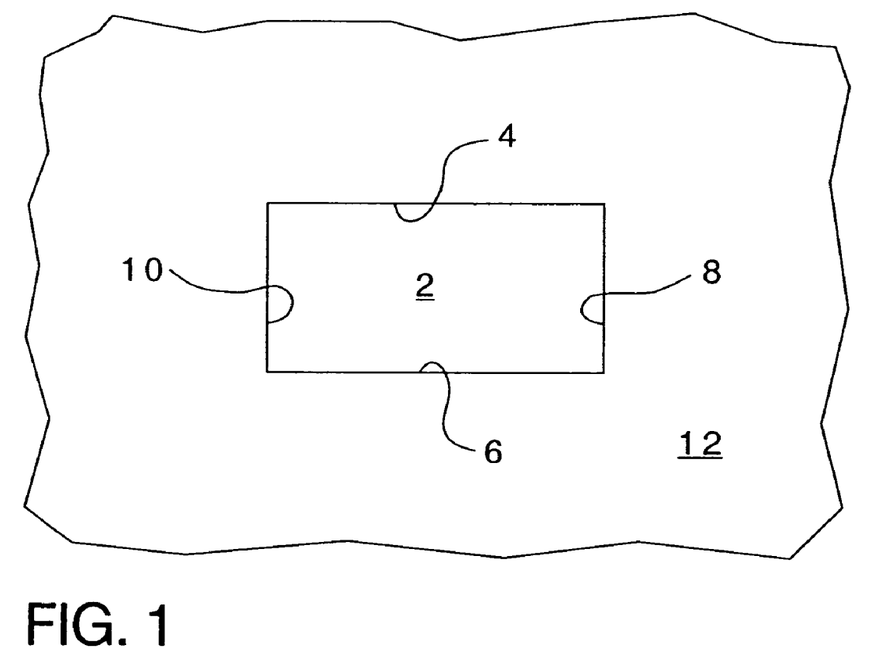
FIG. 1 is a front elevational view of a valve of an embodiment of the present invention.

Referring to FIG. 1, there is shown a valve opening 2 which is defined by an upper passageway-defining surface 4, a lower passageway-defining surface 6 and a pair of lateral passageway surfaces 8, 10 extending therebetween. The valve opening 2 is defined within a structure 12 which may be composed of any suitable material such as stone, concrete, metal, organic materials, such as wood, plastic and combinations thereof.

Figure 2:
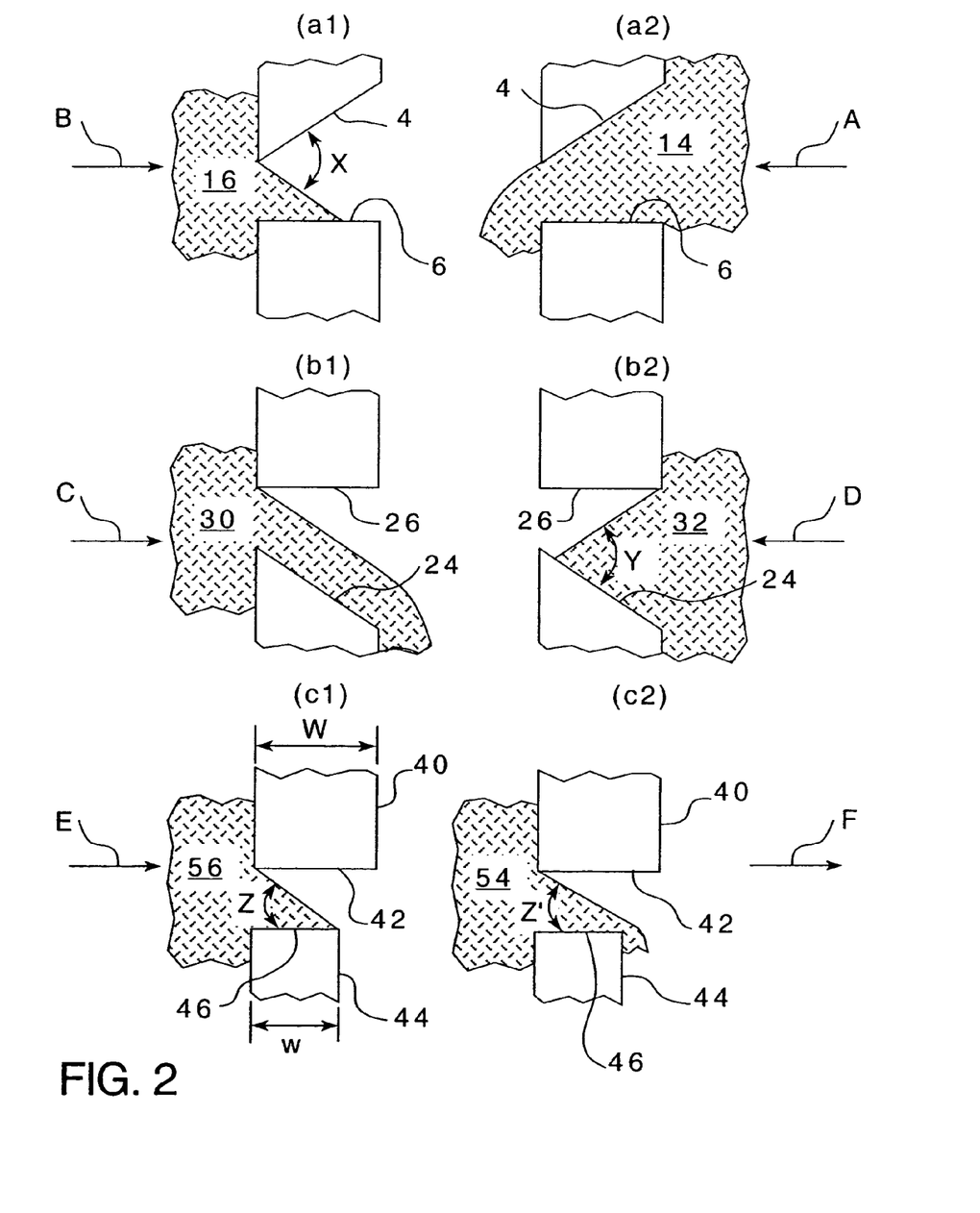
FIG. 2 is a series of pairs of schematic illustrations of one-directional flow valves of the present invention.

Referring to FIG. 2, there are shown three pairs of views of three valves such as a1-a2, b1-b2 and c1-c2. These involve an extension of a principle shown within FIGS. 3 and 4 of U.S. Pat. No. 6,739,827. In this embodiment, movement of the flowable granular material through the valve passageway in a first direction is readily permitted, while it is resisted in the opposite second direction. The flow of the granular material as shown in Figures a1 and a2, which represent sand valves without movable parts is freely permitted in the direction of arrow A as shown in Figure a2, but is resisted in a second direction as shown by arrow B. The particulate material 14 in the valve shown in Figure a2 readily flows in the first direction A under the influence of a force vector such as, for example, gravity or centrifugal (downward as drawn rotational) force between upper passageway-defining surface 4 and lower passageway-defining surface 6. By contrast, the flowable material 16 as shown in Figure a1 is resisted in second direction B. In the form shown, both the upper passageway-defining surface 4 and the lower passageway-defining surface 6, as well as lateral connecting passageway surface 8 and 10 are generally planar. The included angle X between the generally planar passageway-defining surfaces 4, 6 is maybe about 10 to 55° and preferably about 20 to 45°. It will be appreciated that the planar surfaces 4, 6, 8 and 10 may be provided with irregular shapes or curved shapes, if desired, so long as the angle of repose X facilitates the one-way flow concepts of this embodiment of the invention.

Similarly, with respect to the valve shown in b1, b2, the position of the upper and lower passageway-defining surfaces which have been labeled 24 and 26 in these figures is inverted with respect to Figures a1 and a2. With this reversal, it will be seen that the flowable material 30 in Figure b1 moves readily under the influence of gravity or centrifugal force, as desired, through the valve in the first direction C, while the flow of the granular material 32 in a second direction D is resisted. It will be appreciated that the repose angle Y may be about 10 to 90° and preferably about 20 to 45° depending on the granular material involved.

The embodiment shown in Figures c1, c2 shows an upper valve element 40 having a generally planar passageway-defining surface 42 and a lower valve element 44 having a generally flat passageway-defining surface 46. It will be appreciated that in this embodiment the width W of upper valve element 40 is greater than the width w of lower valve element 44. Flow of the flowable granular material 56 in a first direction E is resisted because the granular angle of repose is greater than the design value. Flow of flowable granular materials 54 in the direction F is achieved as a result of the angle of repose $Z^1$ being less than the design value thereby permitting flow in such direction of selected flowable granular materials. This shows an angle of repose Z which is about 10 to 50° and preferably about 20 to 45°. In this embodiment, granular material flow in the directions opposite arrows E and F is resisted.

It will be noted in connection with Figures c1 and c2 that an angle of repose greater than the repose angle Z is subjected to blocking of the material 50 by valve element 40. The portion of flowable granular material with an angle less than the angle of repose $Z^1$ will pass through the valve as shown in Figure c2. In this embodiment, the upper and lower surfaces may be generally horizontal with the difference in widths W, w providing the desired valve action.

Another embodiment of the invention which centers around providing an improved safer retaining wall for flowable granular material. As stated hereinbefore, as the angle of repose of a flowable granular material decreases, the horizontal force within the material increases. The flowable granular material, such as earth, for example, under the influence of such changes can change from a cohesive fragmental material capable of stability, when formed, for example, as an exposed vertical surface, to an unstable "flowable" material by imposition of a mechanical or acoustic shock, or pressure, or by the addition of, or subtraction of, aqueous moisture or that of other fluids within the material or a segment or layer of the material. This can lead to landslides or the collapse of the "earth" wall of an excavation. Solid retaining walls are often employed to resist such failures. When such a landslide or collapse occurs, the earth (or a strata thereof) reconfigures itself in a suitable angle of repose which resists further movement of the "earth". With present retaining wall design, the increased horizontal Rankine force on the retaining wall structure, as the internal Rankine angle changes, can destroy the structure and endanger the objects or personnel protected by the wall.

Figure 3:
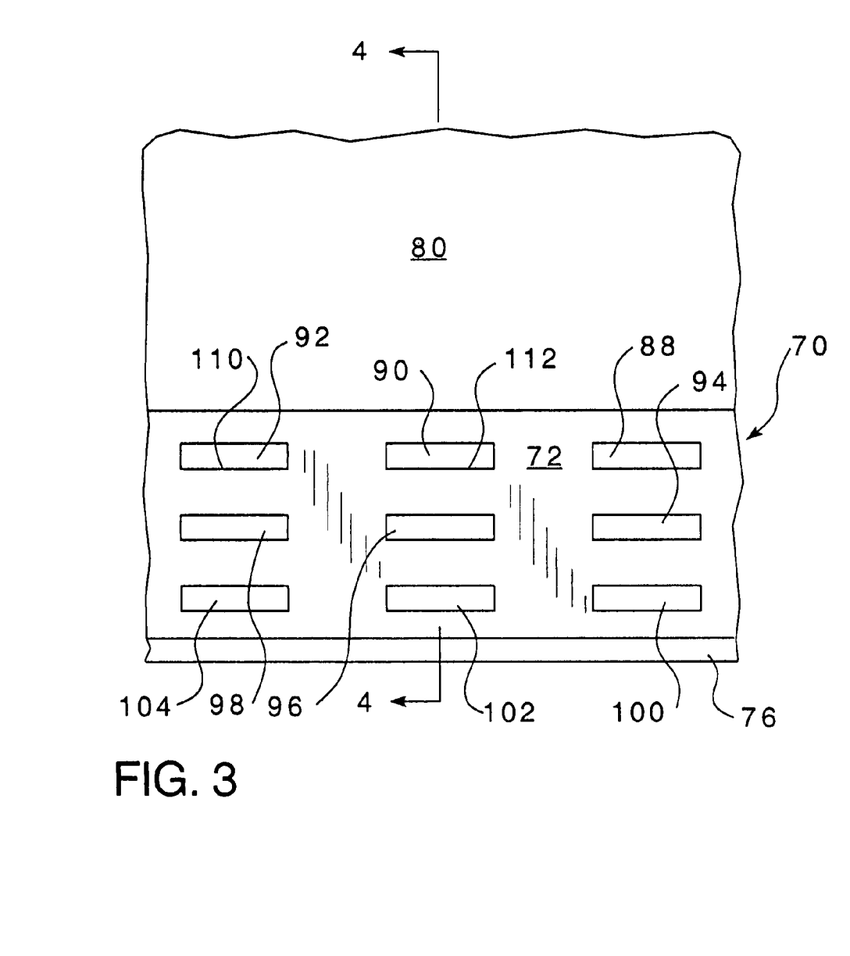
FIG. 3 is a front elevational view of a retaining wall of the present invention disposed adjacent to a pile of flowable granular material.
Figure 4:
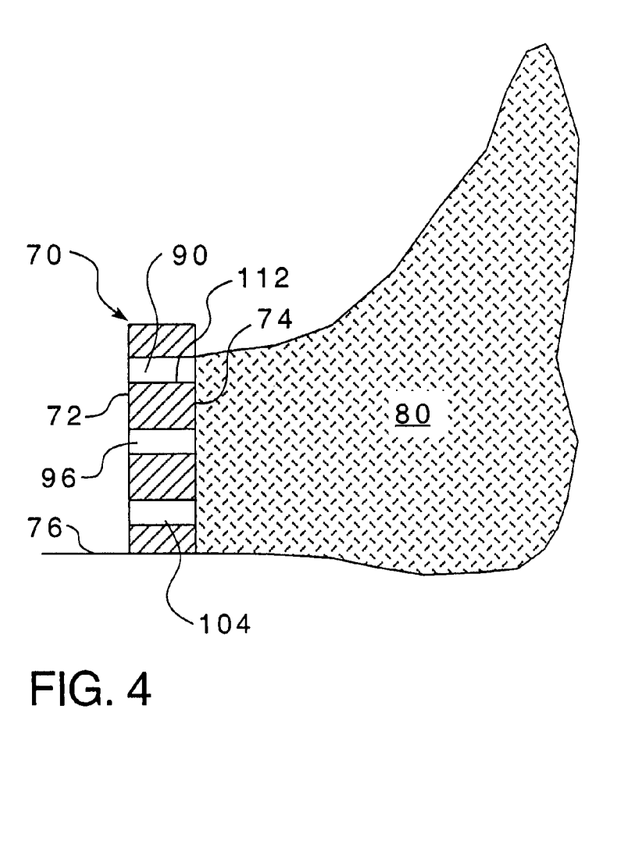
FIG. 4 is a cross-sectional illustration of the retaining wall and adjacent flowable granular material taken through 4-4 of FIG. 3.

In the embodiment of the present invention illustrated in FIGS. 3 and 4, the change that makes the "wall" or a segment or strata of the "wall" unstable causes the now flowable granular material to pass into or further through one or a series of "valves" as described hereinbefore in connection with FIGS. 1 and 2. The contained sloped flowable granular material segments in the vertical series of such valves restrains the further flow of the collapsing "wall" without adding large further destructive horizontal force to the improved retaining wall structure. This enhances the safety of protected objects or personnel beyond the retaining wall. If the change in earth structure is such that it results in a final angle of repose less than that contained by the design of the retaining wall valve segments, the flow of "earth" passes through the valves. This warns observers of the change in earth dynamics while allowing the basic retaining wall to remain in place. There is shown in FIGS. 3 and 4 a retaining wall 70, which may be composed of any suitable material such as stone, concrete, metal, organic materials, such as wood, plastic and combinations thereof. The wall 70 is generally vertically oriented and has a front face 72 and a rear face 74. It is supported adjacent to a surface 76 being protected by the retaining wall 70. Adjacent the rear face 74 is disposed a mound 80 which is or may become a flowable granular material which slopes toward the wall 70. A prime purpose of the wall 70 is to resist undesired flow of the material 80 onto the surface 76. The wall 70 must also resist forces applied to the rear surface 74 by the material 80. The angle of repose of the material being retained is of importance in this context. For example, when the moisture content of the retained flowable granular material 80 increases, it can become flowable granular material. When this occurs, the angle of repose generally decreases and the force attempted to urge the wall in the direction of surface 76 increases. A prior approach to handling such a problem is to make the retaining wall 70 overly strong and, therefore, increase the expenses of the same substantially. In spite of this, failures do occur, particularly with certain types of soils whose flow properties and compaction may change abruptly with moisture content or mechanical vibration such as occurs during an earthquake.

The present design resists such undesired failure of a wall by providing a plurality of elongated horizontal passageways such as 88, 90 and 92 which are provided with a horizontal extent having a ratio to the vertical extent of about 3 to 1 and preferably greater than about 1 to 1 of each said opening 88, 90, 92 dependent on the nature of the flowable granular material. While the range may vary depending upon design preferences, it is preferred that about 70 to 90% of the exposed wall rear surface be occupied by the elongated horizontal passageways. In the form shown, a top row of passageways 88, 90, 92 overlies an intermediate row 94, 96, 98, which, in turn, overlies a row 100, 102, 104. It is preferred that the angle of repose of the flowable granular material within the passageways 88-104 (even numbers only) be such that the material extends only to adjacent the front surface 72 of the wall 70 without spilling over. It is preferred that the base surface of each horizontal passageway such as surface 110 of passageway 92 or surface 112 of passageway 90 be substantially planar and be horizontally oriented.

The retaining wall 70 will withstand the full horizontal stress of the flowable granular being retained. If, for example, increased moisture content or an earthquake causes the flowable granular material to change so that increased horizontal force would be exerted against the retaining wall 70, then the angle of repose becomes less. The greater force is relieved by the flowable granular material sliding further through or out of the passageways 88-104 (even numbers only). This serves to provide a safety valve-type effect by automatically lessening the force applied to the rear surface 74 of the retaining wall, the wall continuing to remain in place and provide the desired protection.

It would be appreciated that the retaining wall 70 uses less material to achieve the desired retention capability than that of the prior art. This is due to the fact that there is automatic "over-pressure" or safety relief.

Referring now to FIGS. 5 through 13, an embodiment of the invention which is designed to employ certain sand valve concepts of the present invention along with horizontal slots for delivering flowable granular material, such as sand, and anchoring elements. The system is structured to be secured within a body of water which has fluid in motion, such as open water, which has waves moving toward a sloping shore surface. One of the problems encountered with such beach areas and the like is that the force of the waves tends to entrain the flowable granular material, such as sand, and transport it away from the beach or land area, thereby creating undesired erosion problems. The system of this embodiment is designed to recapture the flowable granular material and restore it in the beach or shore area, thereby resisting undesired beach erosion.

A second aspect of this embodiment is the ability to use the system to protect a "submerged beach" such as the edge of a channel leading into a fresh or salt water port.

In general, the apparatus is structured to avoid substantial impeding of the force of a water wave approaching the beach, while extracting a portion of the flowable granular particles such as sand contained within a wave and then to inhibit the return of the extracted sand to open water as the water wave recedes from the beach.

It will be appreciated that the structure to be described herein may be of any desired length or width depending upon the physical environment and objectives of the user. Also, the structure is preferably applied in a plurality of vertically spaced units and a greater or lesser number of units may be provided dependent upon the physical environment in which they are placed and the objectives of the user. It is also desired to trap the sand or other flowable granular materials in such a manner as to maintain the normal angle of repose of the sand on that beach. Further, as will be described herein, the individual units are anchored to the beach and have structures to permit return of excess fluids such as water to the main body.

Figure 5:
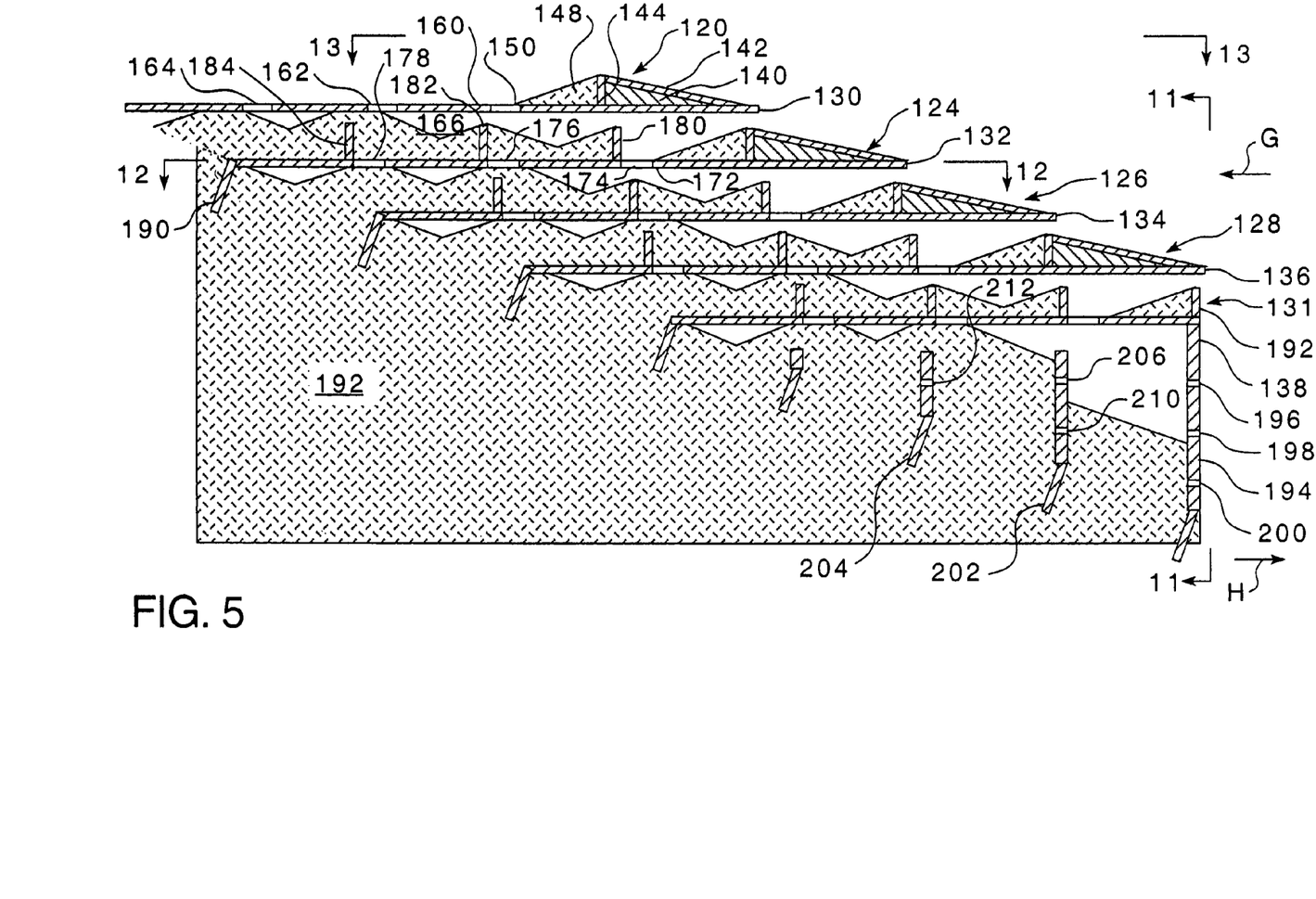
FIG. 5 is a schematic elevational view of a form of beach erosion control system of the present invention.

The flowable granular particles removed from a wave are either stored within the unit in which they are trapped or moved downwardly to a lower level within the structure and deposited on the beach. In FIG. 5, there is shown a plurality of beach stabilizing units 120, 124, 126, 128, 131 which have the right ends, respectively 130, 132, 134, 136, 138, positioned closest to an approaching wave which arrives moving in the direction shown by arrow G and the opposing ends closer to the beach or shore. It will be noted that in the preferred embodiment a step-like arrangement of the units is provided. As shown in FIG. 5, units 128 and 130 have their outer ends farther from the beach than units 124, which, in turn, has its outermost end closer to the beach than unit 126, but farther from the beach than unit 120. Referring to the uppermost unit 120, it has a ballast portion 140 which has an inwardly and upwardly sloped ramp 142 over which the waves will flow. It is preferred that the upwardly sloped ramps be substantially continuous to facilitate efficient flow thereover. It also has a generally vertical rear wall 144 within which sand passing over surface 142 may be deposited such as 148 on generally horizontal surface 150. A plurality of elongated horizontally oriented slots 160, 162, 164 serves to permit sand to pass therethrough and under the influence of gravity and external wave action. The sand drops to the region 166 underlying unit 120 and overlying unit 124 to be captured on the horizontal surface 172 of unit 124 with a portion of the flowable material passing through elongated horizontal slots 174, 176, 178 to drop onto portions of unit 126. Unit 124 has a plurality of vertically projecting barrier plates such as 180, 182, 184 which serve to provide distinct compartments for receipt of the flowable granular material. Finally, an anchor spade 190 projects generally angularly downwardly into the underlying sand 192 to secure the structure in the desired orientation. Similar elements are provided in units 126, 128 and 130. It will be noted that unit 130 does not have a ballast section, but rather has a vertically projecting barrier plate 192. It also provides a downwardly projecting anchor 194 which has openings 196, 198, 200, as well as similar downwardly projecting anchors 202, 204 with openings, respectively 206, 210, 212, which permit drainage of water outwardly toward the open body as indicated by arrow H.

In a preferred embodiment, the upwardly sloped ramps, except for the elongated sand-delivering slots such as 174, 176, 178 will be substantially continuous and preferably be made from a material selected from the group consisting of plastics, organic materials and protected metallic materials, such as metals covered or enclosed within a barrier material, such as a resinous plastic, for example.

It will be appreciated that the height of the opening between the undersurface of the next adjacent vertically spaced unit and the uppermost portion of the inclined upwardly sloping ramp will be about 1 to 3 inches and preferably about ¼ to ½ inch in order to facilitate efficient receipt of the waves.

Figure 6:
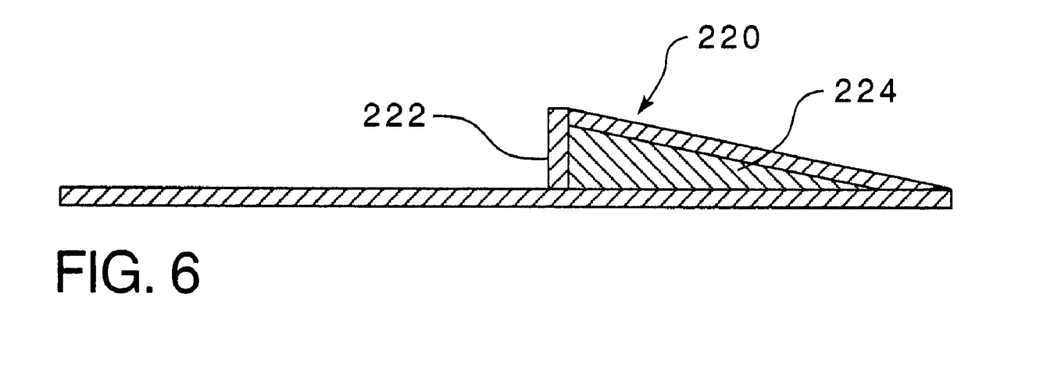
FIG. 6 is an illustration of a wave deflection ramp which forms a portion of a unit of the beach erosion control system.

FIG. 6 shows a more detailed view of an elongated ballast element 220 which has a barrier plate 222. The ballast, which is preferably sealed within the structure, can be any suitable material adequate to maintaining the erosion control unit in place on the beach surface.

Figure 7:
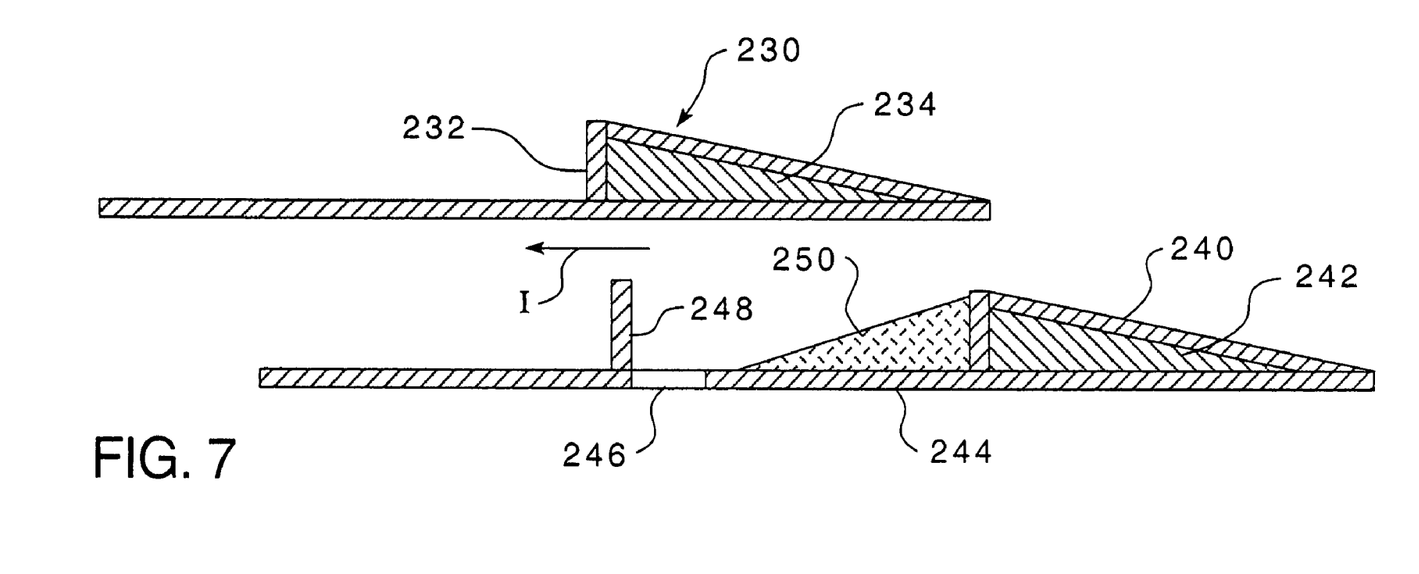
FIG. 7 is an elevational view showing portions of two vertically spaced units of the beach erosion control system.

Referring to FIG. 7, the interaction of adjacent units and valve effect will be considered. In this embodiment, a first wave deflection ramp 230 is oriented inwardly and upwardly toward the shore in a unit (only a portion which is shown) having a generally horizontal surface 232 to receive a portion of the sand with an appropriate ballast material 234 contained within the ballast element. Similarly, a wave deflection ramp 240 has ballast 242 and a generally horizontal surface 244 provided with an elongated slot 246 and a generally vertical barrier plate 248 with a quantity of flowable granular material such as sand 250 supported on horizontal surface 244. It will be appreciated that as the waves move in the direction shown by arrow 1, there is a change in velocity of the wave resulting in a portion of the flowable granular material, such as sand, being deposited on the surface of portion 244 with elongated slot 246 serving to permit the sand to drop into the underlying structure when the quantity of sand 250 reaches a predetermined level. It will be appreciated that the elements described in FIGS. 5 through 7 and in portions of the remaining figures have their elongated direction into the page of the drawing and may be whatever desired length will best accomplish the beach erosion resisting objective.

It is preferred that the wave deflection ramp such as 240 and 230 have an included lesser angle with respect to the horizontal base portion of the unit 244, 232, respectively, of about 10 to 40°. The ballast material should have a specific gravity greater than one. The ballast may be metal pellets enclosed in plastic, for example.

Figure 8:
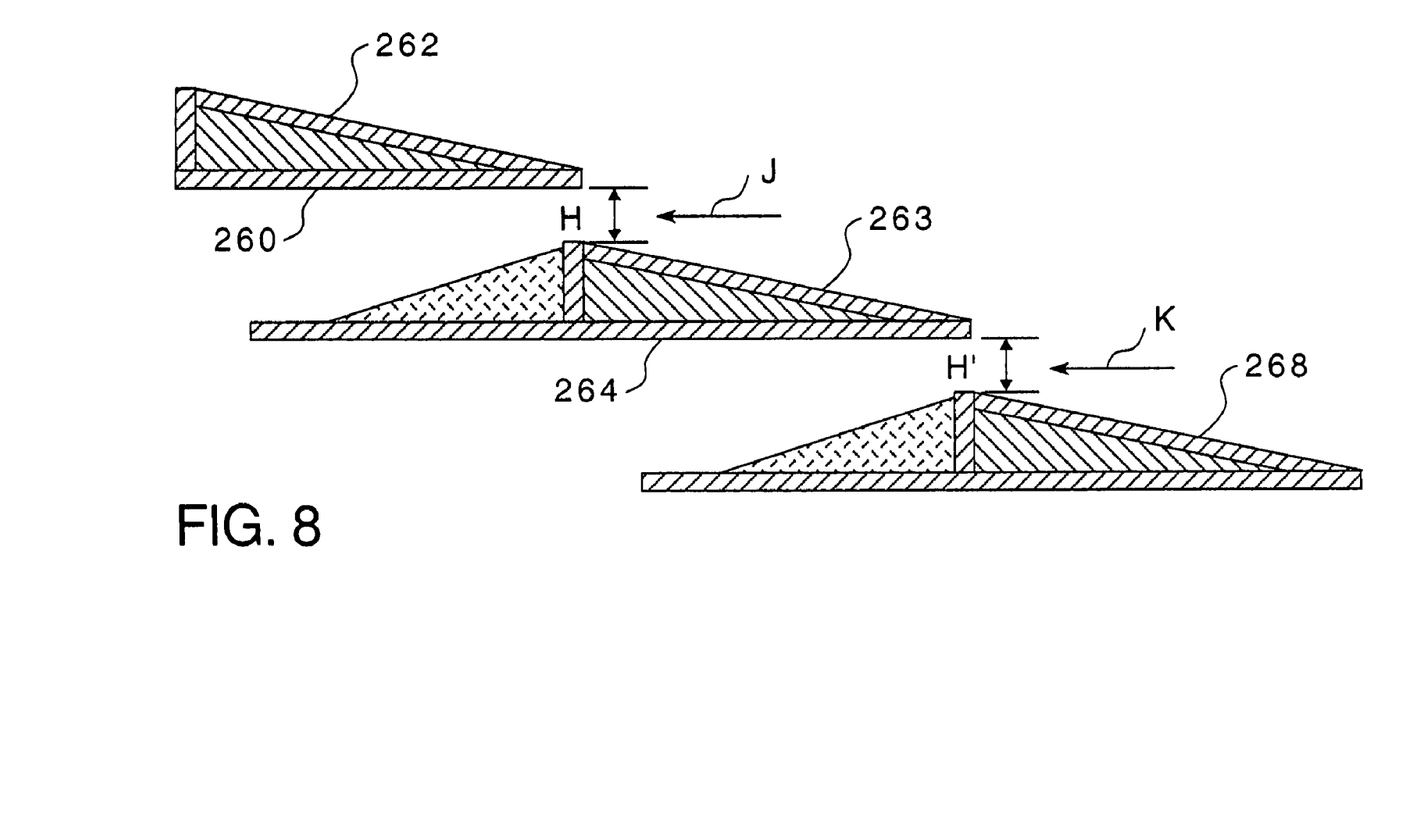
FIG. 8 is a fragmentary illustration showing valve action on portions of the beach erosion control system.

It will be appreciated that the size of the fluid openings which may have a height H from the undersurface such as surface 260 of ballast 262 shown in FIG. 8 to the uppermost surface of ballast 263 or the surface gap $H^1$ between the lower surface 264 of ballast 262 and the uppermost surface of ballast 268 which provides a fluid opening for flow of waves in the directions of arrows J and K, respectively. This thereby allows a portion of the wave optimum in size to enter the structure so that the suspended flowable granular material such as sand can be trapped and deposited on the beach surface. In the form shown in FIG. 5, for example, the lowermost ballast 128 is closest to the approaching wave and, in stepwise manner, the uppermost ballast 120 is farthest therefrom to provide the desired input flow the wave.

Figure 9:
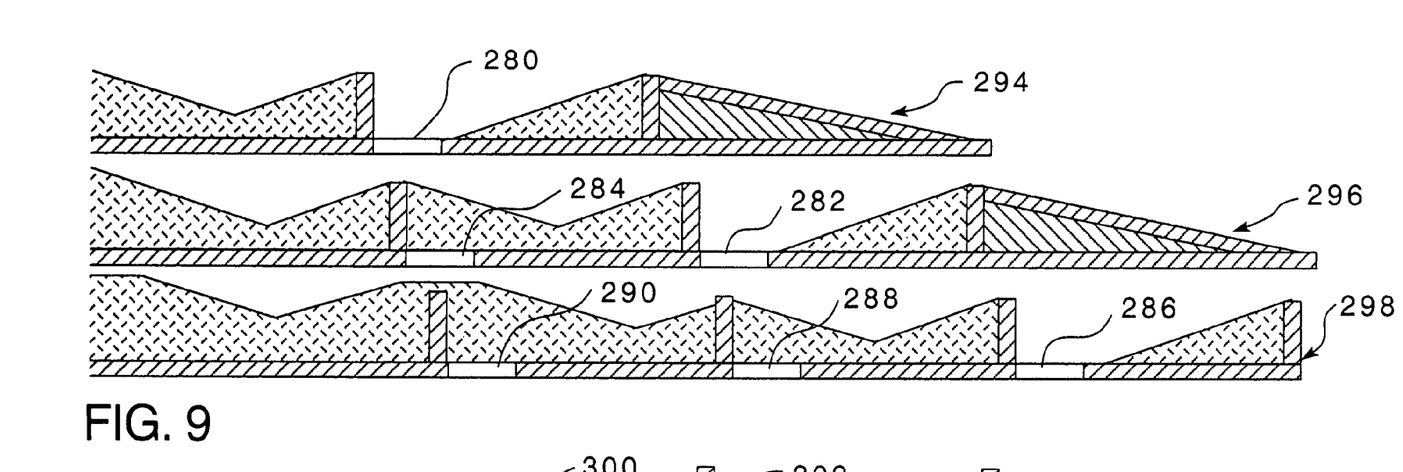
FIG. 9 is a partially schematic view of a portion of the beach erosion control system showing a plurality of units which are vertically spaced from each other.

In FIG. 9, there is shown an end view of the elongated horizontal slots such as 280, 282, 284, 286, 288, 290 to permit progressive downward flow of the material from the uppermost spaced vertical unit 294 through the intermediate unit 296 to the lower unit 298 to thereby facilitate gravitational redeposit of this sand on the beach.

Figure 10:
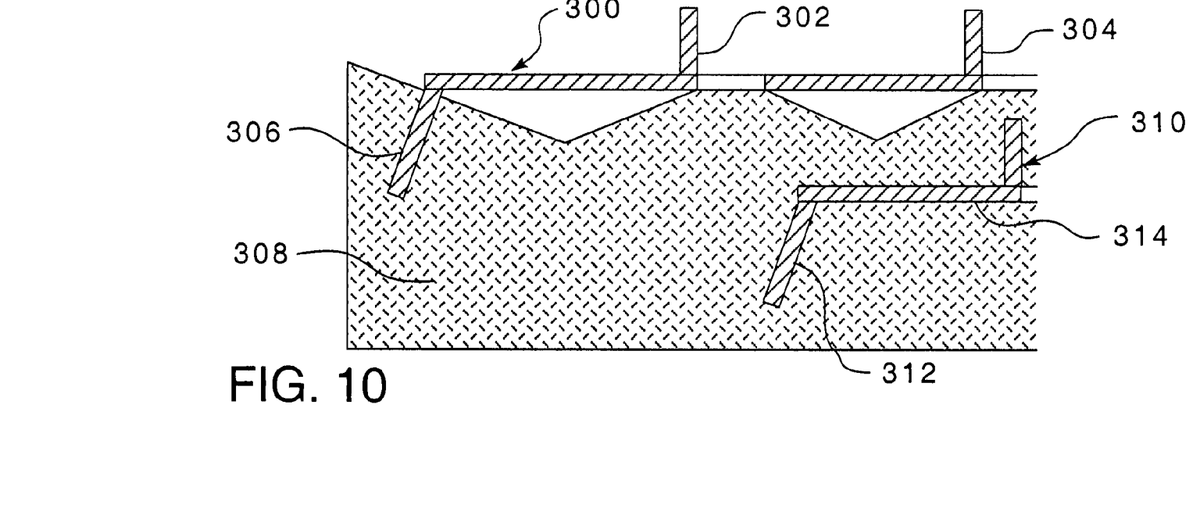
FIG. 10 is an elevational view showing an anchor portion of two units.

FIG. 10 shows an end view of a portion of a unit 300 which has upstanding barrier walls 302, 304 and an anchor portion 306 which extends into the sand 308 to anchor the structure in the desired generally horizontal position within the water which overlies the sand 308. In the portion of unit 310 shown, the anchor 312, as well as the horizontal portion 314, are submerged below sand level. If desired, the units may be placed other than perpendicular to the beach or shoreline to accommodate the anticipated angle of arrival of wave.

It will be appreciated that as sand is deposited as shown in FIG. 10, the deposited sand can lift the structural units above the initial position so as to provide for ongoing efficient removal of sand from the incoming waves.

It will be appreciated that another function of the anchors such as 308, 312 is to resist undesired horizontal rotation of the structure. Further, additional ballast may be added at the outermost portions of the unit, if desired, to resist undesired movement.

In this embodiment the combination of the flow control valves, the horizontal slots, the vertically spaced relationship between units and the anchors are such that the force of the incoming wave is not opposed, but rather utilized to transport and deposit the flowable granular material such as sand in a useful manner to reestablish the beach. The capture and retention of the sand is facilitated by the upwardly projecting elongated vertical barrier plates and the elongated horizontal slots for vertically downward gravitational transfer of the sand. It will be appreciated that the structure both restores the beach and resists further erosion of the sand.

Figure 11:
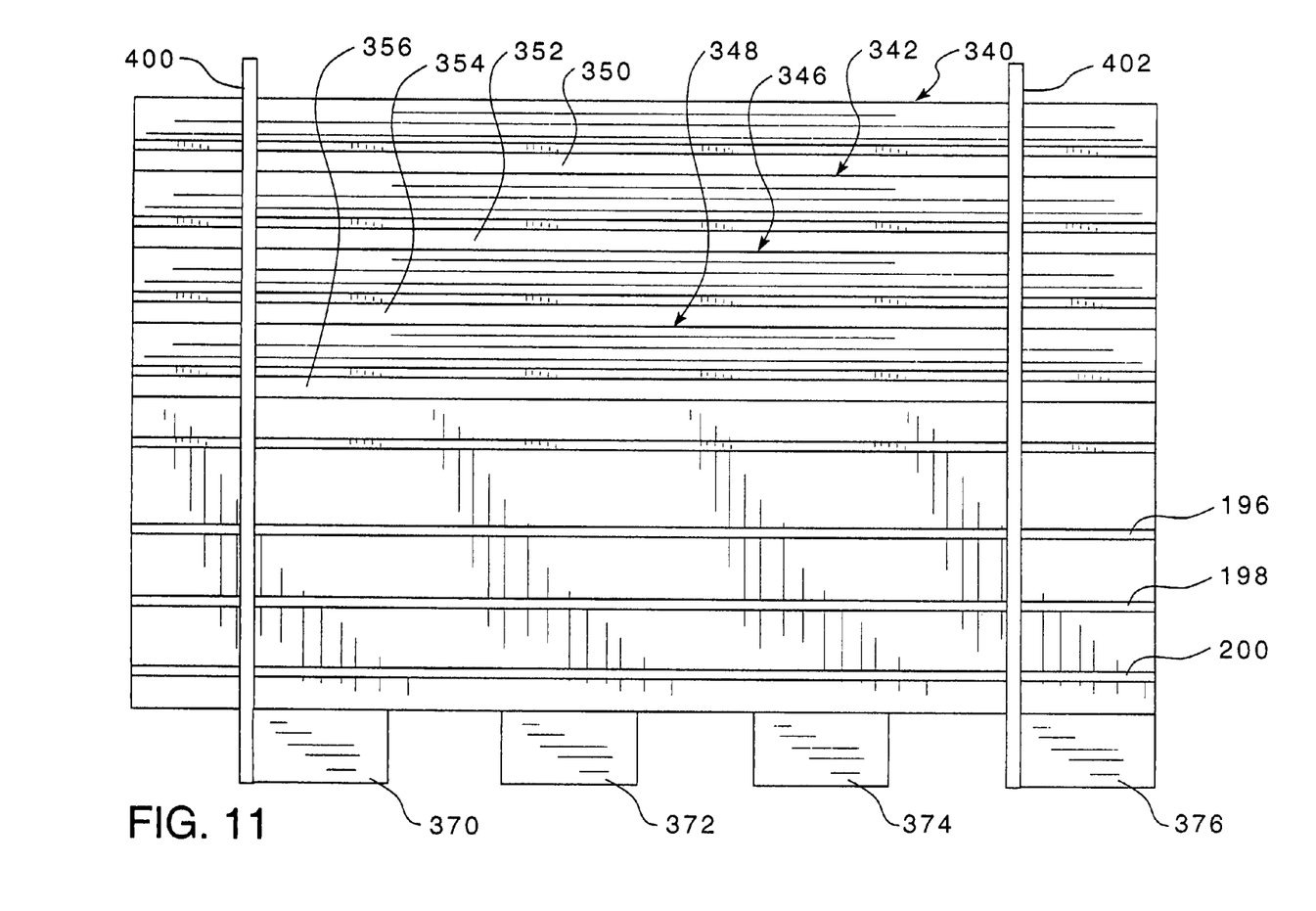
FIG. 11 is a cross-sectional view taken through 11-11 of FIG. 5.

Referring to FIG. 11, there is shown a cross-section taken through 11-11 of FIG. 5 which shows a form of structure as viewed from the direction of which the wave is approaching. The structure has a plurality of elongated units which, in the form shown, extend generally parallel to the beach with the entry spaces for the waves being shown as gaps 350, 352, 354, 356. Water drainage slots such as shown in element 138 in FIG. 5 facilitate discharge of water in the direction coming out of the page to facilitate removal from the stored sand.

Figure 12:
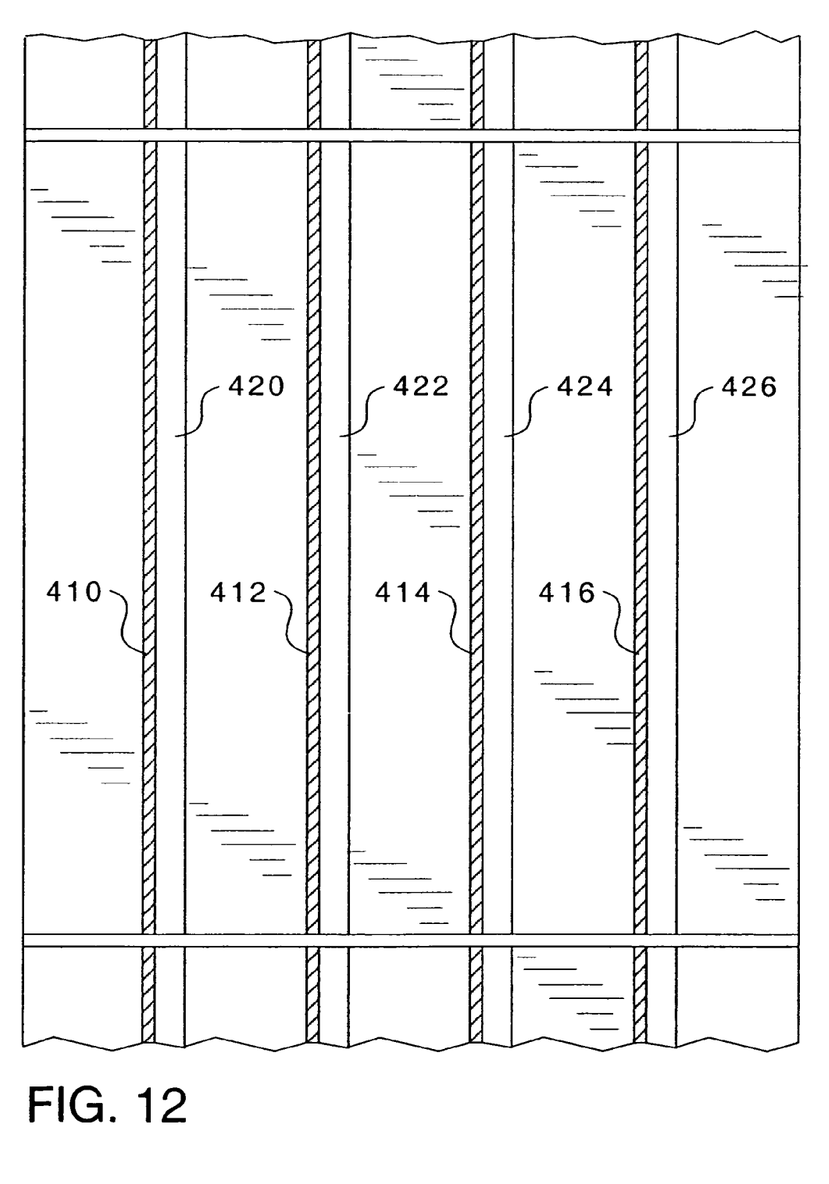
FIG. 12 is a cross-sectional view taken through 12-12 of FIG. 5.

Referring to FIG. 12, which is in a view taken similar to that through Section 12-12 of FIG. 5, wherein the plurality of vertically projecting barrier walls 410, 412, 414, 416 have adjacent horizontal slots 420, 422, 424, 426, respectively, to facilitate sand moving downwardly from adjacent the positions where the vertically upwardly projecting walls appear.

Figure 13:
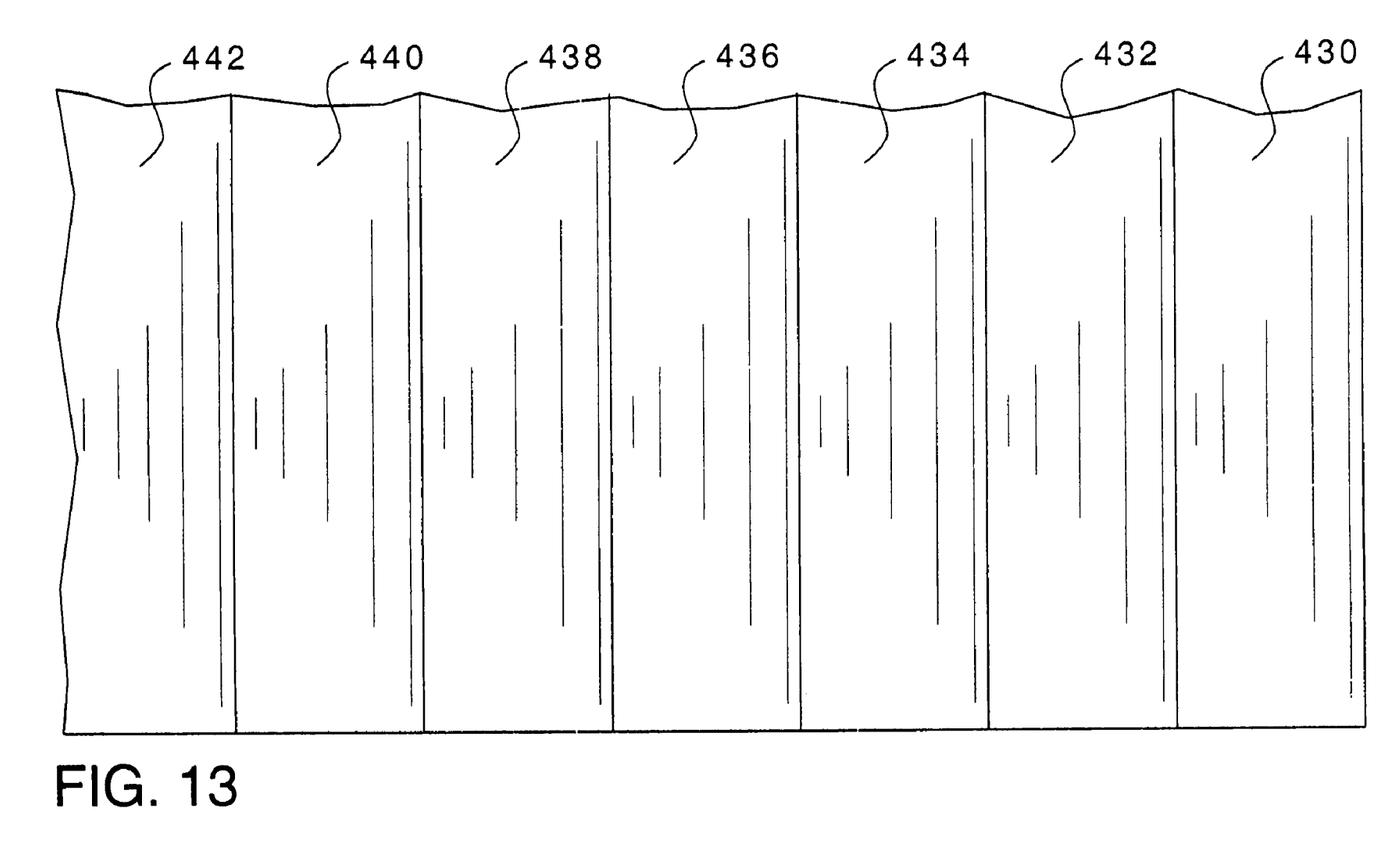
FIG. 13 is a top plan view of the embodiment of FIGS. 5 through 12 generally, but showing four additional elements.

Referring to FIG. 13, there is shown a top plan view through 13-13 of FIG. 1 employing different reference numerals for clarity of presentation. FIG. 13 illustrates in top plan view modular aspects of the beach retention and replenishment embodiment. The wavy line to the left of section 442 is toward the beach and the wavy line on the top of FIG. 13 is oriented generally angularly with respect to the beach. The solid line to the right of section 430 is adjacent the direction from which the waves will arrive. The units 430, 432, 434, 436, 438, 440, and 442 may contain the elements described in connection with FIGS. 5-12 and may be upwardly stepped from unit 430 to unit 442. The number of units 430-442 (even numbers only) and the length of the units 430-442 (even numbers only) may vary according to the specific design.

It will be appreciated that the present invention has provided means for establishing a first embodiment wherein a flowable granular material valve without requiring movable parts facilitates flow in one direction through the valve passageway and resists flow in the opposite direction. In addition, in another embodiment, an efficient economical retaining wall having passageways so configured with respect to the normal angle of repose of an adjacent of pile of flowable granular material as to resist undesired excessive forces against the wall. Finally, in another embodiment, the beach renourishment construction is provided which facilitates allowing wave flow, removing flowable granular material, such as sand, therefrom and retaining such sand while returning the water to the open body of water.

Whereas particular embodiments of the invention have been described herein for purposes of illustration, it will be evident to those skilled in the art that numerous variations of the details may be made without departing from the invention, as defined in the appended claims.

The invention claimed is:

1. A retaining wall for a flowable granular material comprising
   a hill composed of said flowable granular material,
   a wall positioned along a lower portion of said hill and having a front face and a rear face,
   said hill being supported at least partially by said wall,
   said wall having a height greater than the adjacent portion of said hill disposed adjacent said rear face,
   said wall being provided with a plurality of generally horizontal passageways such that the angle of repose of said material within said passageways will permit said material to flow toward the front surface of said passageways without substantial discharge of said material therefrom, while under changed circumstances will effect a reduction in the force against the rear face of said wall by permitting discharge of said material therethrough.

2. The retaining wall for a flowable granular material of claim 1 including
   said elongated passageways having a length greater than their height.

3. The retaining wall for a flowable granular material of claim 2 including
   said passageways having a horizontal-to-vertical ratio of about 3 to 1.

4. The retaining wall for a flowable granular material of claim 1 including
   about 70 to 90% of the exposed wall rear surface being occupied by said passageways.

5. The retaining wall for a flowable granular material of claim 3 including
   said passageways being of sufficient size to provide overpressure relief to thereby resist undesired displacement of said wall responsive to increased pressures thereon from said flowable granular material.

6. The retaining wall for a flowable granular material of claim 4 including
   said wall having a height greater than the height of the adjacent said flowable granular material disposed adjacent the rear of said wall.

7. The retaining wall for a flowable granular material of claim 1 including
   said generally horizontal passageways extending continuously from said wall rear face to said wall front face.

8. The retaining wall for a flowable granular material of claim 1 including
   at least some of said passageways being disposed at different elevations on said wall from other said passageways.

\* \* \* \* \*

UNITED STATES PATENT AND TRADEMARK OFFICE
CERTIFICATE OF CORRECTION

| | | |
|---|---|---|
| PATENT NO. | : 7,507,056 B2 | Page 1 of 1 |
| APPLICATION NO. | : 11/656744 | |
| DATED | : March 24, 2009 | |
| INVENTOR(S) | : William J. Spry | |

It is certified that error appears in the above-identified patent and that said Letters Patent is hereby corrected as shown below:

On the Title Pg, Item (74) Attorney, Agent, or Firm, "Carol A. Manno, Esq." should read --Carol A. Marmo, Esq.--.
Column 1, line 57, "opening" should read --openings--.
Column 3, line 6, "terms" should read --term--.
Column 3, line 51, "surface" should read --surfaces--.
Column 5, line 62, "anchoring elements." should read --anchoring elements, is shown--.
Column 8, line 9, "wave" should read --waves--.
Column 8, line 64, "embodiment," should read --embodiment, is provided--.

Signed and Sealed this

Fourteenth Day of February, 2012

David J. Kappos
*Director of the United States Patent and Trademark Office*